United States Patent [19]

Van Breemen et al.

[11] 4,035,812
[45] July 12, 1977

[54] INK JET RECORDER AND CHARGE RING PLATE THEREFOR WITH REDUCED DEPLATING CURRENT

[75] Inventors: Bertram Van Breemen, Dayton; John A. Robertson, Chillicothe, both of Ohio

[73] Assignee: The Mead Corporation, Dayton, Ohio

[21] Appl. No.: 704,569

[22] Filed: July 12, 1976

[51] Int. Cl.² ........................................ G01D 15/18
[52] U.S. Cl. ................................................ 346/75
[58] Field of Search ............................. 346/75, 140

[56] References Cited
U.S. PATENT DOCUMENTS

| | | | |
|---|---|---|---|
| 3,921,916 | 11/1975 | Bassous | 346/75 X |
| 3,949,410 | 4/1976 | Bassous et al. | 346/75 |
| 3,975,741 | 8/1976 | Solyst | 346/75 |
| 3,984,843 | 10/1976 | Kuhn | 346/75 |

OTHER PUBLICATIONS

Pedersen, K. A., Ink Jet Charge Plate, IBM Technical Disc. Bull., vol. 19, No. 2, July 1976, p. 673.

Primary Examiner—George H. Miller, Jr.
Attorney, Agent, or Firm—Biebel, French & Nauman

[57] ABSTRACT

An ink jet recorder has a means for forming streams of ink drops and a means for selectively charging the drops in the streams as they are formed. The drops pass through charge ring orifices which are lined with charge rings. Charging potentials are selectively applied to the charge rings to induce selectively charges in the drops as they are formed. In order to prevent a large deplating current from flowing between the charge rings in the event of an inadvertent short, a means for limiting current flow is provided. Current may be limited by a charge ring formed from a bulk resistive material such as an epoxy filled with conductive particles. Alternatively, current may be limited by discrete resistors positioned adjacent the charge rings and through which the charging potential is applied.

15 Claims, 9 Drawing Figures

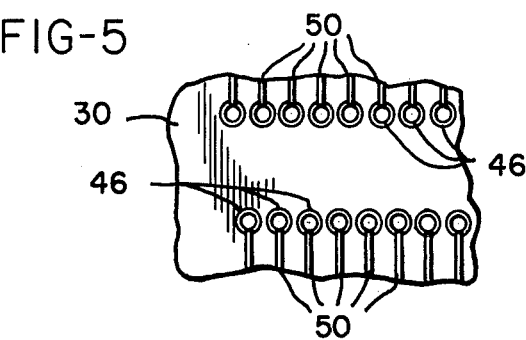
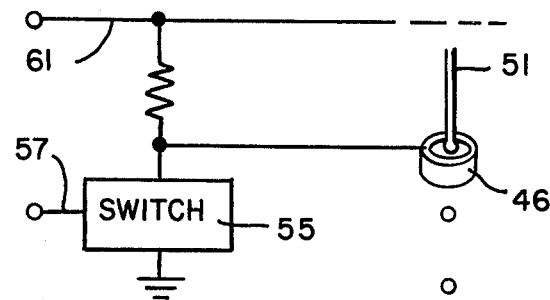
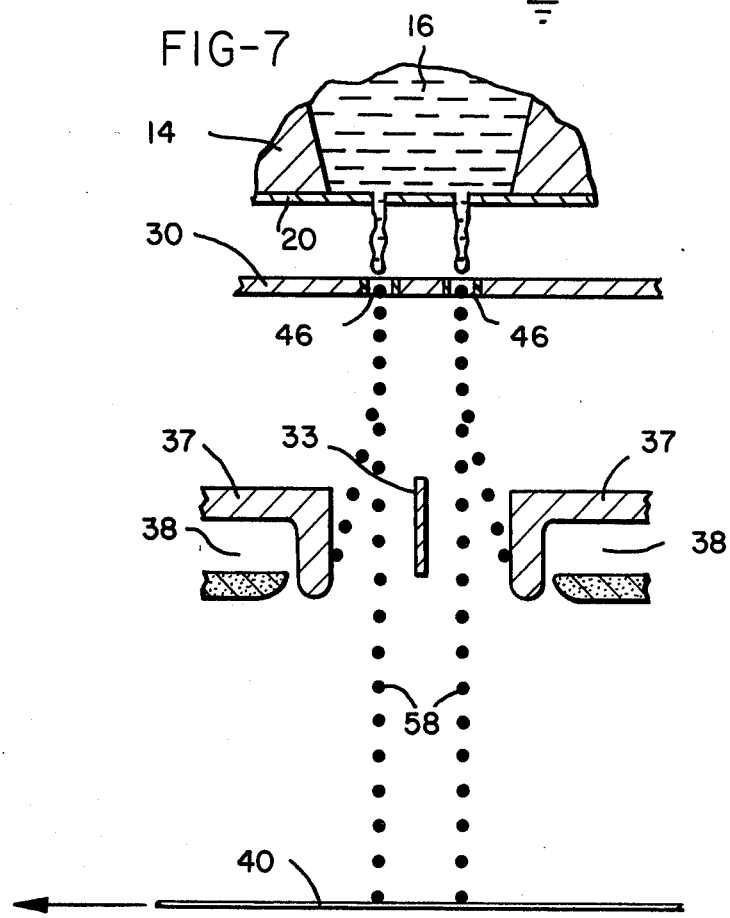
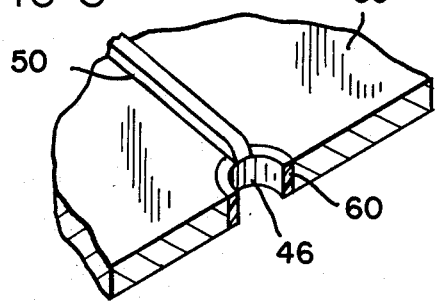
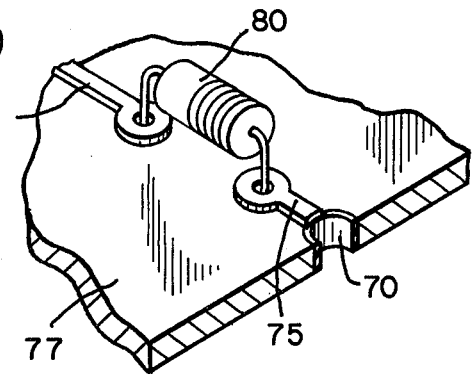

INK JET RECORDER AND CHARGE RING PLATE THEREFOR WITH REDUCED DEPLATING CURRENT

BACKGROUND OF THE INVENTION

The present invention relates generally to the field of fluid drop generation and more specifically to jet drop recorders of the type shown generally in U.S. Pat. No. 3,710,998 to Mathis, issued Oct. 31, 1972 and assigned to the assignee of the present invention. In recorders of this type, a number of orifices are provided to receive an electrically conductive recording fluid, such as a water base ink, from a pressurized fluid manifold and to eject the fluid in parallel streams. The fluid flows through the orifices in a plate with the formation of drops being stimulated by the application to the plate of a series of transverse waves. This method of drop generation is more completely described in U.S. Pat. No. 3,739,393 to Lyon et al., issued June 12, 1973, and assigned to the assignee of the present invention.

Graphic reproduction in recorders of this type is accomplished by depositing selected ones of the drops in the drop streams on a moving web of paper or other material. The drops are selectively charged prior to subjecting the stream to a drop-deflecting electric field. The charged drops are deflected by the field while the uncharged drops pass through the field unaffected. Printing is accomplished by allowing either the group of charged drops or the group of uncharged drops to strike the web. A catcher is positioned in the trajectory of the other group of drops such that they are caught and thereby prevented from striking the web.

Charging of the drops is accomplished by the application of discrete charge control signals to charging electrodes near the break off point of the drop streams. As the drops separate from their parent fluid filaments, they carry a portion of the charge induced in the filament by the associated charging electrode.

The charging electrodes have typically comprised orifices in a non-conductive charge ring plate which are lined with a conductive material, such as gold, to form charge rings. Such a prior art charge plate arrangement is shown and described more completely in U.S. Pat. No. 3,701,998 issued Oct. 31, 1972, to Mathis and assigned to the assignee of the present invention. Other charging electrodes have been configured as notched plates such as shown in U.S. Pat. No. 3,618,858, issued Nov. 9, 1971, to Culp and assigned to the assignee of the present invention.

Whatever the exact configuration utilized, however, prior art charge electrodes have been subject to failure as a result of deplating currents between adjacent electrodes. The apparatus generating the fluid drops may also generate droplets of small size which form an ink mist. While very little of this mist will be present at any one time, it is possible that an amount of the conductive ink sufficient to carry a current may be deposited on the surface between adjacent electrodes. When a potential exists between the electrodes, a current will flow and, as a result, the charge electrodes may be totally or partially deplated. A partially deplating electrode will be less effective in inducing a charge in the ink drops passing the electrode and will result in degradation of the print image.

One approach which as been taken to eliminate this deplating process is shown in U.S. Pat. No. 3,604,980, issued Sept. 14, 1971, to Robertson, and assigned to the assignee of the present invention. Robertson suggests the use of an insulating coating over the surface of the charging electrode to prevent adjacent electrodes from shorting out. Such a configuration may, however, be disadvantageous in that a charge may build up inside the ring and may not be readily dissipated. This will, of course, inhibit rapid switching of the charge electrodes.

SUMMARY OF THE INVENTION

An ink jet recorder for printing on a moving web includes a means for forming a plurality of streams of ink drops. Further provided are a plurality of charge inducing means, each associated with and positioned adjacent one of the plurality of streams of ink drops. A means for selectively providing a charging potential to each of the charge inducing means is also included. Means providing an electric field through which the streams of drops pass deflects the charged drops in a set of deflected trajectories and permits the uncharged drops to pass in a set of undeflected trajectories. A catcher means is provided in one of said sets of trajectories such that the drops therein are not deposited upon the web. Each of the charge inducing means comprises a current limiting means for preventing substantial deplating current from flowing between the charge inducing means. The current limiting means may comprise a discrete resistance formed of stanous oxide or, alternatively, a distributed resistance. The charge inducing means may include a charge electrode with the distributed resistance forming the electrode. An epoxy filled with a conductive material may be used to form a charge ring comprising the charging electrode.

Accordingly, it is an object of the present invention to provide an improved ink jet recorder having current limiting means for preventing a substantial deplating current from flowing between charging electrodes; to provide such a recorder in which the charging electrodes are composed of a non-conductive base filled with conductive granules; to provide such a recorder in which the non-conductive material is an epoxy and the granules are silver particles; and, to provide such a recorder in which the electrodes are in the form of a ring.

Other objects and advantages of the invention will be apparent from the following description, the accompanying drawings and the appended claims.

BRIEF DESCRIPTION OF THE DRAWINGS

FIG. 5 is an enlarged partial plan view of the charge ring plate showing the charge rings in greater detail;

FIG. 6 is a schematic representation of the circuitry used to selectively charge ink drops;

FIG. 7 is an enlarged partial sectional view similar to FIG. 1 illustrating selective charging of ink drops;

FIG. 8 is a perspective view of the charge ring plate of the present invention with portions broken away; and FIG. 9 is a view, similar to FIG. 8, showing an alternative embodiment of the present invention.

DETAILED DESCRIPTION OF THE INVENTION

Figure 1:
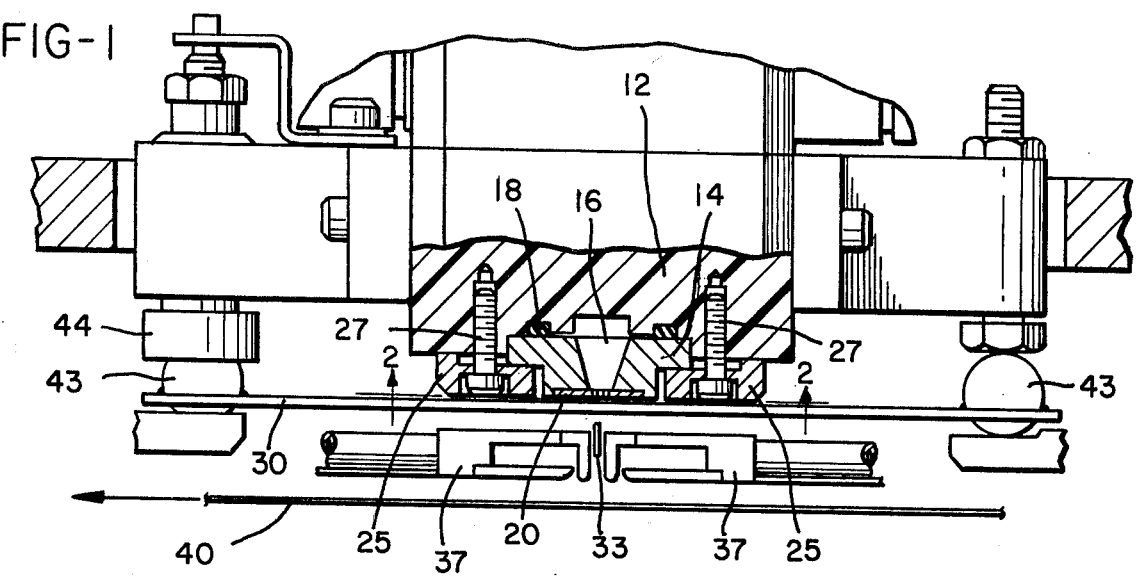
FIG. 1 is a side view of the ink jet recorder of the present invention with portions broken away to reveal internal structure.
Figure 2:
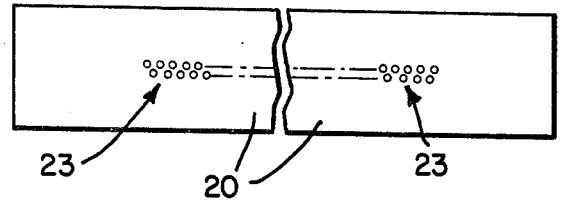
FIG. 2 is a view showing the orifice plate as seen generally along line 2—2 in FIG. 1.

The present invention relates to ink jet recorders of the type used for printing on a moving web of paper or other material. A portion of the recorder of the present invention is shown in FIG. 1. A means for forming a plurality of streams of ink drops includes a casing 12 and a member 14 which define ink reservoir 16. Gasket 18 is positioned therebetween to effectively seal the reservoir. Orifice plate 20 defines a plurality of orifices 23 which are positioned along the plate 20 in parallel rows as shown in FIG. 2. A conductive ink, supplied to the reservoir 16, tends to flow downwardly through openings 23 to form elongated ink filaments which then break into streams of ink droplets. In order to facilitate this drop formation, a mechanical oscillator (not shown) is provided to mechanically stimulate the orifice plate 20. As a result, the size of the drops formed and the length of the parent filaments are substantially uniform.

Figure 3:
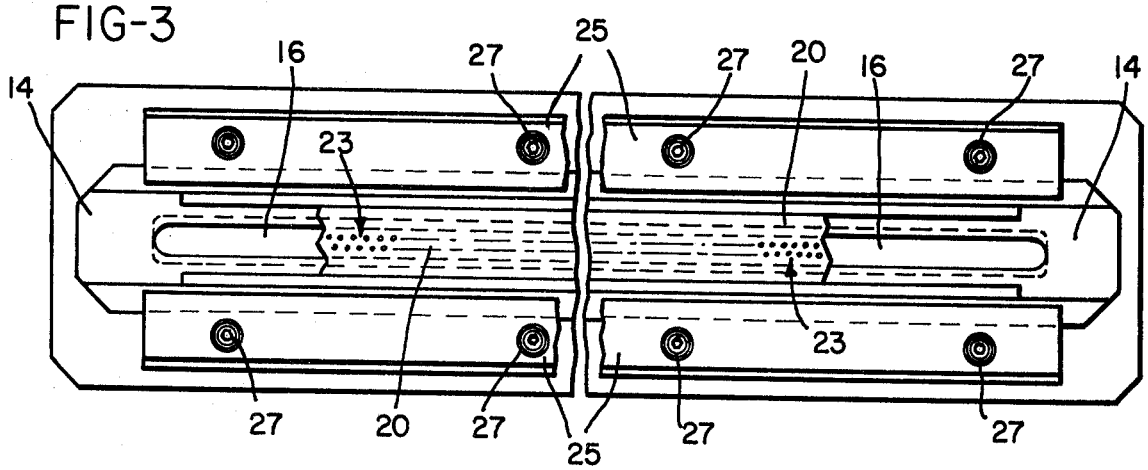
FIG. 3 is a view taken generally along line 2—2 with portions broken away showing the orifice plate mounted adjacent the ink reservoir.

The orifice plate 20 and member 14, as seen in FIG. 3, are engaged by brackets 25 and bolts 27 which are threaded into openings in casing 12. The two parallel rows of ink drop streams are arranged such that the streams will each pass through a respective one of the charge ring orifices in charge ring plate 30. The drops in these streams will be charged selectively. Deflection ribbon 33 acts as a means for providing an electrical field through which the drops pass for deflecting the charged drops in a set of deflected trajectories and for permitting the uncharged drops to pass in a set of undeflected trajectories. Deflection ribbon 33 extends between and along the length of the rows of drop streams. Deflection ribbon 33 is charged with a potential of the same polarity as the charge induced in the drops. Catcher means 37 are positioned outwardly of the drop streams and are grounded. Catcher means 37 are positioned such that drops in one set of trajectories are not deposited on moving web 40 but are intercepted by the catchers and removed. Thus drops are either deposited or not deposited on the web depending on whether they are charged. Catcher means 37 define cavities 38 which may be advantageously maintained at a pressure less than atmospheric pressure such that drops impinging on catcher 37 will be ingested and carried away. The drops so caught may be filtered and recirculated to reservoir 16, if desired.

Figure 4:
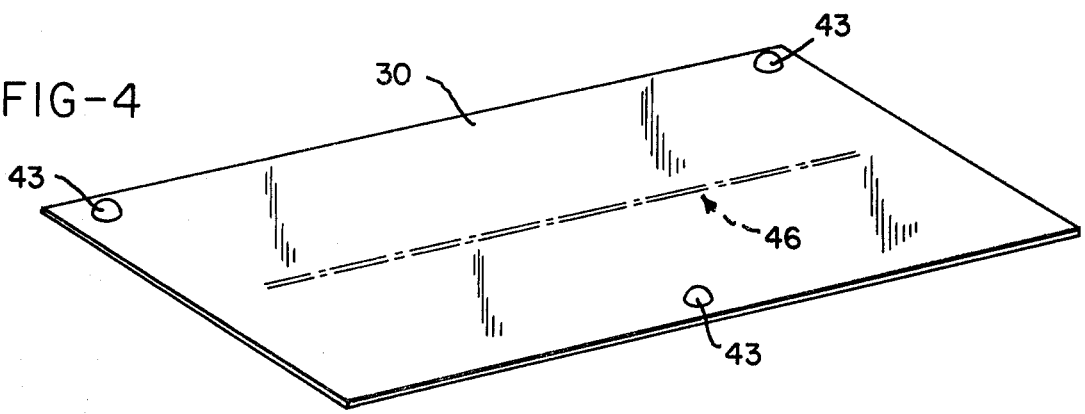
FIG. 4 is a perspective view showing the charge ring plate of the present invention.

The charge ring plate 30 defines a plurality of charge ring orifices positioned in parallel rows and alignable with the orifice plate 20. FIG. 4 shows the charge ring plate in perspective and illustrates the mounting mechanism which includes machined balls 43. As seen in FIG. 1, these balls co-operate with receptacles 44 and bolt 45 for mounting the upper portion of the recorder and for aligning the streams of drops with the charge ring orifices on plate 30. This mounting arrangement and other details of the recorder are more fully described in U.S. patent application Ser. No. 704,572 filed on even date herewith and assigned to the assignee of the present invention.

As shown in FIG. 5, the plurality of charge inducing means each comprise a charging electrode in the form of charge rings 46. Conductor means 50 on the non-conductive charge ring plate 30 supply the appropriate charge inducing potential to each charge ring from a means for selectively providing the charging potential (not shown). Various data handling devices may be used to determine and supply the proper charging potential to the recorder to cause proper drop deposit sequencing such that the desired images will be printed on the web. One such arrangement is shown in U.S. Pat. No. 3,913,719, issued Oct. 21, 1975 to Frey and assigned to the assignee of the present invention.

As shown in FIG. 6, each charge ring acts to induce a charge in the ink drops as they are formed from filament 51. The ink reservoir 16 is grounded and when a potential is applied to the charge ring, the filament adjacent the ring will have induced in it a charge of opposite polarity. If a drop is then formed from the end of the filament, this drop will carry with it the induced charge. Switch 55, which may advantageously be solid state, provides the charge inducing potential applied to the charge ring in response to a control signal applied at its input 57. Switch 55 will ground the charge ring when conducting, and when not conducting will cause the charge ring to receive a charge inducing potential of V volts from bus 61.

The manner in which charged and uncharged drops are affected by the electric field through which they pass is shown in FIG. 7. Deflection ribbon 33 is charged with a potential of the same polarity as that induced in the charged drops. Charged drops passing through the field between ribbon 33 and catchers 37 will therefore be repelled from ribbon 33 in a set of deflected trajectories which impinge upon catcher means 37. Uncharged drops pass unaffected through the field in a set of undeflected trajectories as illustrated by drops 58. These drops then impinge on moving web 40 and result in an image being printed on the web.

The details of construction of one embodiment of the charge inducing means are shown in FIG. 8. The conductor means 50 deposited on charge ring plate 30 are electrically connected to charge rings such as 46. These charge rings may be formed by depositing within charge ring aperture 60 a layer of bulk resistive material. This material may advantageously comprise a non-conductive matrix filled with a plurality of conductive materials such as an epoxy filled with silver particles. One such material is sold commercially as E-SOLDER No. 3021, available from Acme Chemicals and Insulation Company, Division of Allied Products Corporation, New Haven, Conn. The orifices may typically be on the order of 0.013 inches with an epoxy layer of 0.001 inch. The epoxy, very thin in consistency, may be applied by brushing, rolling, or spraying on the surface of the non-conductive plate and then blowing this material through the orifice. The face is then wiped so that the orifices are not shorted together by a residual epoxy layer.

In operation the charge ring 46 will provide a current limiting means and prevent a substantial deplating current from flowing between charge rings in the event that adjacent charge rings are shorted by a layer of conductive ink on the charge ring plate. Since ordinarily little current will flow to the charge rings during normal printing operations, the voltage drop resulting from the bulk resistivity of the charge ring during normal printing will be negligible.

While it would be possible to use a resistor remotely positioned from the charge ring plate 30 to limit current flow in each of the charge ring circuits, such a configuration would limit the switching speed of the charge rings. As with any transmission line, conductor means 50 has an inherent distributed capacitance along its length. The rate at which the potential on charge ring 46 can be altered is, therefore dependent in part on the RC time constant including the equivalent resistance of the voltage source and the distributed capacitance of line 50. If a resistance is added in series with line 50 at a point remote from the charge electrode, this added resistance will increase the time constant and impede switching of the charge ring. The rise time of the charge inducing potential at the charge ring 46 will not be as adversely affected with the bulk resistive charge ring of the present invention, however, since this resistance will not form part of the RC charging circuit for the distributed capacitance of line 50.

The use of conductive epoxy for the charge ring also limits deplating current by providing a physical configuration which makes it difficult for adjacent rings to be shorted. When a charge ring plate having conductive epoxy rings is initially placed into operation, a slight deplating current may flow between adjacent rings. This will result in conductive silver particles on the surfaces of the rings being partially eroded, and causing the charge ring surfaces to become somewhat pitted. Conductive ink on the surface of the charge rings will not flow as easily into these recesses and the likelihood of a deplating current will be reduced. The rings will remain sufficiently conductive, however, to prevent the formation of a surface charge on the inside of the charge rings.

Referring now to FIG. 9, there is shown a perspective view with portions broken away of an alternative embodiment of the present invention. Charge ring 70 comprises a layer of conductive material, such as gold, which may be deposited on the interior surface of the charge ring aperture by a plating process. A conductor means 75 on the surface of charge ring plate 77 is electrically connected to charge ring 70. A discrete resistance 80 comprises a resistor of suitable value, e.g., 1 megohm, which is connected in series with the conductor 75 and which provides a means for limiting current supplied to the charge ring 70. During normal operation of the ink jet recorder, the change induced in each individual ink drop is relatively small and, therefore, the current flowing to the charge rings is minimal. As a result even though resistance 80 is substantial, very little voltage drop will occur across the resistor during normal printing operation.

If a conductive film of ink should be deposited on plate 77 shorting out adjacent charge rings 70, it will be appreciated that the resistors in series with these rings will add a 2 megohm load to the shorted circuit. As a result, the current will be limited and very little deplating of the rings will occur. Current limiting accomplished in this fashion is greatly preferable to using current limiting resistances positioned somewhat remotely from the charge rings. As discussed in regard to the embodiment of FIG. 8, a remote resistance will adversely affect the RC time constant of the conductors 75 on the surface of the charge ring plate 77 and rapid changing of the charge inducing potential on the charge rings 70 will be impeded.

Alternatively, the discrete resistance 80 may comprise a strip of stanous oxide or other such resistive material on the surface of charge ring plate 77. In such a construction, each conductor means 75 would be printed on plate 77 and would define a gap. A predetermined amount of stanous oxide would then be deposited on the surface of the plate 77 such that the gap would be bridged and electrical connection effectuated. The stanous oxide material could be deposited by a sputter process with the amount of material deposited determining the value of the resistance.

While the forms of apparatus herein described constitute preferred embodiments of the invention, it is to be understood that the invention is not limited to these precise forms of apparatus, and that changes may be made therein without departing from the scope of the invention.

What is claimed is:

1. In an ink recorder for printing on a moving web comprising means for forming a plurality of streams of ink drops directed toward said moving web, a plurality of charge inducing means, each of said charge inducing means associated with and positioned adjacent a respective one of said plurality of streams of ink drops, means for selectively providing a charging potential to each of said charge inducing means, means for providing an electric field through which said streams of drops pass for deflecting the charged drops in a set of deflected trajectories and for permitting the uncharged drops to pass in a set of undeflected trajectories, and catcher means, positioned in one of said set of trajectories such that the drops therein are not deposited upon said web, the improvement in which each of said charge inducing means comprises:

current limiting means including a substantial resistance for preventing a substantial deplating current from flowing between said charge inducing means.

2. The recorder of claim 1 further comprising a charge ring plate defining a plurality of orifices; in which said plurality of charge inducing means comprise charge rings in said orifices and conductor means on said charge ring plate connected to said charge rings; and in which said current limiting means comprises a discrete resistance positioned on said charge ring plate and connected between said means for selectively providing a charging potential and said conductor means.

3. The recorder of claim 1 in which said current limiting means comprises a discrete resistance.

4. The recorder of claim 3 in which said discrete resistance is formed of stannous oxide and is substantially 1 megohm.

5. The recorder of claim 1 in which each of said charge inducing means comprises a charging electrode and in which said current limiting means comprises a distributed resistance in said charging electrode.

6. The recorder of claim 5 in which said distributed resistance comprises a charge ring formed of a nonconductive matrix filled with a conductive material.

7. The recorder of claim 6 in which said conductive material comprises silver particles.

8. In an ink jet recorder having means for forming a stream of ink drops, means for selectively charging drops in said streams including a charge ring orifice through which said drops pass, a charge ring lining said orifice, and means selectively providing a charging potential to said charge ring, means for deflecting said charged drops, a moving web upon which said drops are to be deposited, and means for catching said deflected drops such that they are not deposited upon said web, the improvement in which said charge ring comprises a current limiting means including:

a layer of non-conductive material filled with a plurality of conductive granules.

9. The device of claim 8 in which said non-conductive material comprises an epoxy and said granules comprise silver particles.

10. A charge ring plate for use with an ink jet recorder, comprising:
   a non-conductive plate defining a plurality of charge ring orifices,
   charge rings lining said charge ring orifices, said charge rings formed from a bulk resistive material to provide current limiting, and
   conductor means on said non-conductive plate for selectively providing charging potentials to said charge rings.

11. The charge ring plate of claim 10 in which said bulk resistive material comprises an epoxy filled with conductive granules.

12. The charge ring plate of claim 11 in which said conductive granules are silver particles.

13. In a charge inducing means for selectively charging ink drops in a plurality of ink drop streams in an ink jet recorder, comprising
   a non-conductive plate,
   a plurality of charge inducing electrode means positioned on said plate such that each of said electrode means will be adjacent an associated one of the plurality of ink drop streams, and
   conductor means on said non-conductive plate for selectively providing charge inducing potential to each of said electrode means,
   the improvement in which each of said charge inducing electrode means comprises current limiting means, positioned on said non-conductive plate adjacent an associated ink drop stream, for preventing a substantial depleting current from flowing between said plurality of charge inducing electrode means,
   said current limiting means including a bulk resistive electrode.

14. The charge inducing means of claim 13 in which each of said bulk resistive electrodes is formed from a resistive epoxy comprising a non-conductive epoxy resin filled with conductive particles.

15. The charge inducing means of claim 14 in which said conductive particles comprise silver granules.

* * * * *

UNITED STATES PATENT AND TRADEMARK OFFICE
CERTIFICATE OF CORRECTION

PATENT NO. : 4,035,812
DATED : July 12, 1977
INVENTOR(S) : Bertram Van Breemen and John Robertson It is certified that error appears in the above-identified patent and that said Letters Patent are hereby corrected as shown below:

Column 1, line 10, "3,710,998" should be --3,701,998--

Column 3, line 52, after "orifice" insert --in orifice--.

Column 6, line 44, "stannous" should be --stanous--.

Column 6, line 57, after "charging" insert --said--.

Signed and Sealed this

Twenty-second Day of November 1977

[SEAL]

Attest:

RUTH C. MASON
Attesting Officer

LUTRELLE F. PARKER
Acting Commissioner of Patents and Trademarks